(12) United States Patent
Cockeram (10) Patent No.: US 6,683,243 B1
(45) Date of Patent: Jan. 27, 2004

(54) SELECTIVE EMISSION MULTILAYER COATINGS FOR A MOLYBDENUM THERMOPHOTOVOLTAIC RADIATOR

(75) Inventor: Brian Vern Cockeram, North Huntingdon, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 10/162,611

(22) Filed: Jun. 6, 2002

(51) Int. Cl.⁷ ............................................. H01L 31/058
(52) U.S. Cl. ...................... 136/253; 428/216; 428/702; 428/699; 428/689; 428/336; 431/100
(58) Field of Search .................... 136/253; 428/216, 428/702, 699, 689, 336; 431/100

(56) References Cited

U.S. PATENT DOCUMENTS

| | | | | |
|---|---|---|---|---|
| 5,080,724 A | * | 1/1992 | Chubb ......................... | 136/253 |
| 5,403,405 A | * | 4/1995 | Fraas et al. .................. | 136/253 |
| 6,091,018 A | * | 7/2000 | Fraas et al. .................. | 136/253 |
| 6,177,628 B1 | * | 1/2001 | Fraas et al. .................. | 136/253 |
| 6,271,461 B1 | * | 8/2001 | Fraas et al. .................. | 136/253 |
| 6,379,789 B1 | * | 4/2002 | Crowley et al. ............. | 428/336 |
| 2003/0034065 A1 | * | 2/2003 | Meulenberg, Jr. ........... | 136/253 |

OTHER PUBLICATIONS

Yue et al, "Emissivity enhancement coatings for thermophotovoltaic (TPV) radiator applications," DOE Report No. WAPD–T–3235, Dec. 1, 1998.*

Cockeram et al, "The development and testing of emissivity enhancement coatings for thermophotovoltaic (TPV) radiator applications," Thin Solid Films, vol. 355/356, pp. 17–25, (1999).*

Cockeram et al, "The spectral emittance and stability of coatings and textured surfaces for thermophotovoltaic (TPV) radiator applications," DOE Report No. B–T–3295, Nov. 1, 2000.*

* cited by examiner

*Primary Examiner*—Alan Diamond
(74) *Attorney, Agent, or Firm*—Julia Cook Moody; Paul A. Gottlieb (57) ABSTRACT

Multilayer coating designs have been developed to provide selective emission for a molybdenum thermophotovoltaic (TPV) radiator surface. These coatings increase the surface emissivity of a molybdenum TPV radiator substrate in the wavelength range that matches the bandgap of the TPV cells to increase the power density of the TPV system. Radiator emission at wavelengths greater than the bandgap energy of the TPV cells is greatly reduced through the use of these coatings, which significantly increases the efficiency of the TPV system. The use of this coating greatly improves the performance of a TPV system, and the coating can be tailored to match the bandgap of any practical TPV system.

12 Claims, 12 Drawing Sheets

Figure 1. Spectral emissivity curve for a greybody emitter, a ZrC coating deposited on molybdenum.

Figure 2. Comparison of the calculated absorption (emittance) values for multilayer coatings deposited on molybdenum: 0.128 μm $Al_2O_3$/ 0.02 μm Mo / 0.128 μm $Al_2O_3$ (solid line), 7-layer coating 0.01 μm $TiO_2$ / 0.01 μm Mo / 0.167 μm $TiO_2$ / 0.01 μm Mo / 0.170 μm $TiO_2$ / 0.292 μm Mo / 0.04 μm $TiO_2$ (dashed line), and 7-layer coating 0.10 μm $Al_2O_3$/ 0.20 μm $TiO_2$ / 0.10 μm $Al_2O_3$/ 0.020 μm Mo / 0.0181 μm $Al_2O_3$ / 0.02 μm $TiO_2$ / 0.233 μm $Al_2O_3$ (dotted line).

Figure 3. Measured total emittance values as a function of wavelength for the 3-layer $Al_2O_3$/molybdenum/$Al_2O_3$ coating deposited on molybdenum by NASA-GRC in run # R40400 (circles, Mo-414) compared with modeling results for two coating designs. The coating thicknesses are given in the Table. The thick solid line is at a wavelength of 2.2 μm, where the energy = $E_g$.

Figure 4. Comparison of measured total emittance values as a function of wavelength (room temperature) for a 3-layer $Al_2O_3$/Molybdenum/$Al_2O_3$ coating deposited on molybdenum by NASA-GRC (Run # R40400). Six different molybdenum coupons were coated in one deposition run with the results shown by the inverse triangle, triangle, circle, square, diamond, and triangle. Results for uncoated molybdenum are shown by the open circle. The thick line is at a wavelength of 2.2 $\mu m$, where the energy = $E_g$.

Figure 5. Comparison of calculated power density for a MIM in use with a radiator that is either uncoated molybdenum, uncoated Morton CVD SiC, 3-layer $Al_2O_3$/molybdenum/$Al_2O_3$ coating (run #40400) in the as-received condition or after 10 thermal cycles to 1100°C. Some calculated results are given in Tables 3 and 4. The emissivity results for the six coatings are shown in Figure 4. All of the coatings were deposited on molybdenum substrates.

Figure 6. Comparison of calculated total efficiency for a MIM in use with an radiator that is uncoated molybdenum, uncoated Morton CVD SiC, 3-layer $Al_2O_3$/molybdenum/$Al_2O_3$ coating (run #40400) in the as-received condition or after 10 thermal cycles to 1100°C. The calculated results are given in Tables 3 and 4. All of the coatings were deposited on molybdenum substrates by NASA-GRC.

Figure 7. Comparison of measured total emittance values as a function of wavelength (room temperature) for a 3-layer $Al_2O_3$/Molybdenum/ $Al_2O_3$ coatings deposited on molybdenum by NASA-GRC in the as-received condition and after 10 thermal cycles between 1100°C and room-temperature. The results are shown for the same coupon for run # R40400 (coupon Mo-414; circles for as-received and squares for after thermal cycles). The thick line is at a wavelength of 2.2 μm, where the energy = $E_g$.

Figure 8. Range of optimum variables for an oxide/molybdenum/oxide coating that provides selective emission for a TPV radiator application. The oxides are $Al_2O_3$, $TiO_2$, or $HfO_2$. A range of thicknesses for the layers is defined.

Figure 8. Range of optimum variables for a 5-layer oxide/molybdenum/oxide/molybdenum/oxide coating that provides selective emission for a TPV radiator application. The oxides are $Al_2O_3$, $TiO_2$, or $HfO_2$. A range of thicknesses for the layers is defined.

Figure 10. Range of optimum variables for a 5-layer oxide-1/oxide-2/molybdenum/oxide-2/oxide-1 coating that provides selective emission for a TPV radiator application. The oxides are $Al_2O_3$, $TiO_2$, or $HfO_2$. A range of thicknesses for the layers is defined.

Figure 11. Range of optimum variables for a 7-layer oxide/molybdenum/oxide/molybdenum/oxide/molybdenum/oxide coating that provides selective emission for a TPV radiator application. The oxides are $Al_2O_3$, $TiO_2$, or $HfO_2$. A range of thicknesses for the layers is defined.

Figure 12. Range of optimum variables for a 7-layer oxide-1/oxide-2/oxide-1/molybdenum/oxide-1/oxide-2/oxide-1 coating that provides selective emission for a TPV radiator application. The oxides are $Al_2O_3$, $TiO_2$, or $HfO_2$. A range of thicknesses for the layers is defined.

ically different from the optimum spectral range (solar spectrum; wavelength<1 micron) of the coatings described in R. E. Peterson and J. R. Ramsey, J. Vac. Sci. Technology, Vol. 12 (1975) at 471 and R. N. Schmidt, K. C. Park, and J. E. Janssen, "High Temperature Solar Absorber Coatings," WPAFB Tech. Rep. No. ML-TDR-64-250, Part I (1963) and Part II (1964). Furthermore, the structure of the 5-layer and 7-layer coatings are significantly different than those used in previous studies. These coating designs have also been optimized to provide high surface emittance in the spectral range that matches the TPV cells (wavelength=1 to 3 microns) with low emittance at wavelength greater than 3 microns to improve efficiency, which is significantly different than the other coatings developed for solar applications with a high emissivity at wavelengths less than 1.0 microns.

SELECTIVE EMISSION MULTILAYER COATINGS FOR A MOLYBDENUM THERMOPHOTOVOLTAIC RADIATOR

The United States Government has rights in this invention pursuant to a contract awarded by the U.S. Department of Energy.

BACKGROUND OF THE INVENTION

1. Field of the Invention

The present invention relates to the field of thermophotovoltaic (TPV) direct energy conversion in general, and in particular this invention embodies a novel method to improve efficiency by coating the emitter with multiple layers of oxides and molybdenum.

2. Description of the Related Art

A thermophotovoltaic (TPV) system consists of a radiator surface that is heated to produce photons that are converted to electrical power by TPV cells. High temperature metallic structural materials that are considered for TPV radiator applications, such as molybdenum, have a low emissivity (~0.1 to 0.2) and do not provide the needed power density for a practical TPV system.

Two approaches have been taken for increasing the surface emissivity of a molybdenum TPV radiator to 0.8 or higher for at least 500 hours at 1100 degrees C. The first approach involves application of a thermal spray coating of either a carbide or an oxide and is discussed in B. V. Cockeram, D. P. Measures, and A. J. Mueller, The development and testing of emissivity enhancement coatings for thermophotovoltaic (TPV) radiator applications, Thin Solid Films Vol. 355/356 (1999) at 17–25, and B. V. Cockeram and J. L. Hollenbeck, The spectral emittance and stability of coatings and texture surfaces for thermophotovoltaic (TPV) radiator applications, Elevated Temperature Coatings: Science and Technology IV, N. B. Dahotre, J. M. Hampikian, and J. E. Moral (eds.), TMS, Warrendale, Pa. (2001) at 327–342. Other examples of use of oxide coatings to improve efficiency are described in Fraas, et al., U.S. Pat. No. 6,177,628 and Fraas, et al., U.S. Pat. No. 5,403,405. The second approach, also discussed in the references cited above, involves surface modification to create a rough surface texture.

Figure 1:
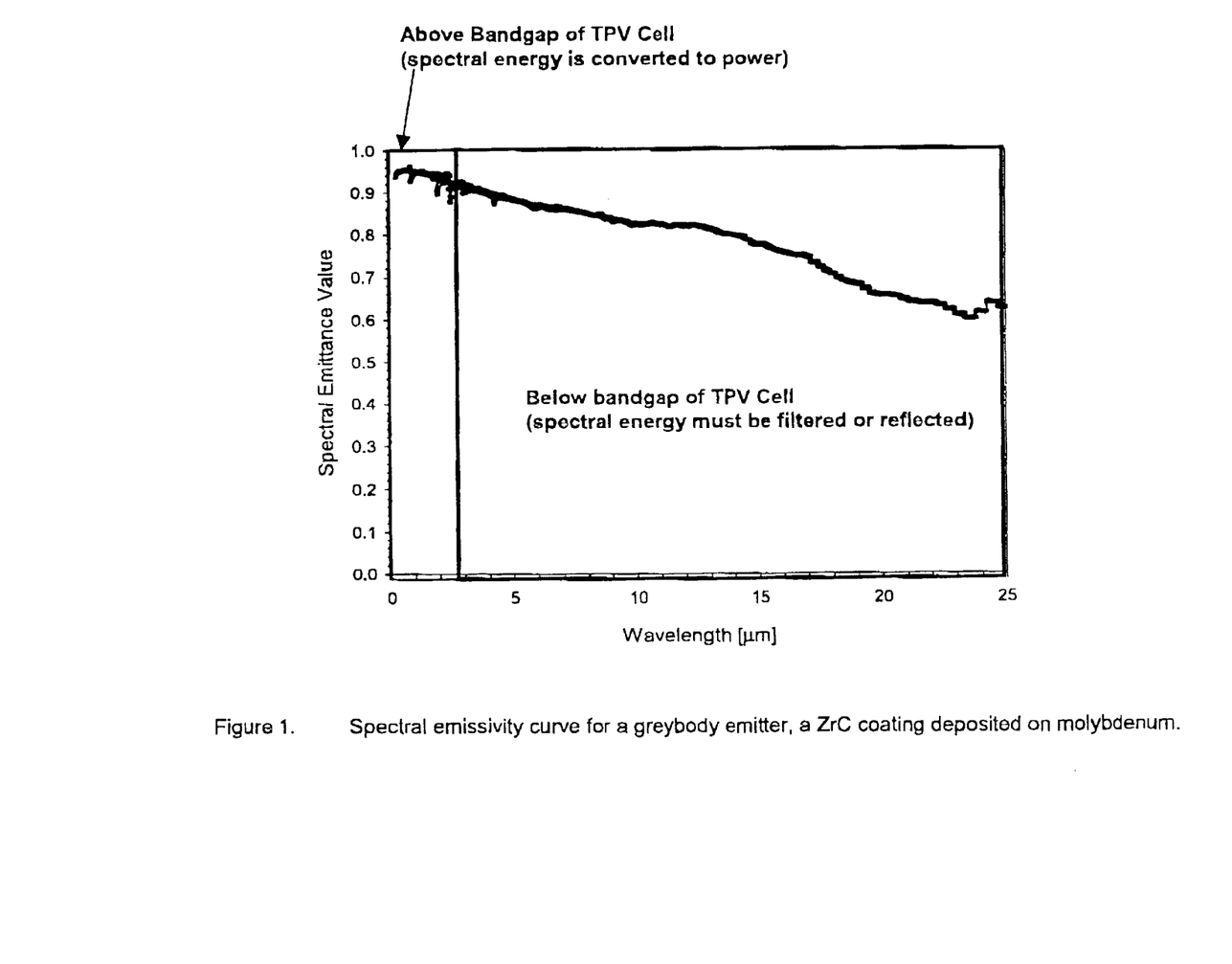
FIG. 1 is a spectral emissivity curve for a greybody emitter, specifically, a ZrC coating deposited on molybdenum.

Both the coating and surface modification candidates are essentially greybody emitters that provide a high emittance over a wide range of wavelengths, see FIG. 1. Photons emitted from a greybody radiator with a wavelength of less than 2 to 2.5 microns (energy greater than or equal to bandgap energy of the TPV cell ($E_g$=0.52 to 0.55 eV)) are converted to electrical power. Photons emitted from a greybody radiator with a wavelength greater than 2 to 2.5 microns (energy<$E_g$) are not converted into electrical power, and must be filtered or reflected back to the radiator.

This invention describes the use of multilayer coatings for a molybdenum TPV radiator that selectively emits photons predominantly in the wavelength range (1 to 3 microns) that matches the bandgap of TPV cells with $E_g$=0.52 to 0.55 eV to provide the power density that is needed for a practical TPV system. A low emissivity is provided by these selective emitting coatings at wavelengths greater than 3 microns (energy<$E_g$), which greatly improves the efficiency of a TPV system.

Multilayer coating designs have been used to increase or control the absorptance of various materials in the solar spectrum range (wavelength<1 micron). See, e.g., D. A. Jaworkske, Thin Solid Films, Vol. 332 (1998) at 30–33; R. E. Hahn and B. O. Seraphin, J. Vac. Sci. Technology, Vol 12. (1975) at 905; R. E. Hahn and B. O. Seraphin, "Spectrally Selective Surfaces," (1979) at 1–69; R. E. Peterson and J. R. Ramsey, J. Vac. Sci. Technology, Vol. 12 (1975) at 471; and R. N. Schmidt, K. C. Park, and J. E. Janssen, "High Temperature Solar Absorber Coatings," WPAFB Tech. Rep. No. ML-TDR-64-250, Part I (1963) and Part II (1964).

A 3-layer $Al_2O_3$/Molybdenum/$Al_2O_3$ coating was developed for molybdenum that provided high emittance at a wavelength less than 1 micron. No other selective emitting coatings have been developed for molybdenum. The 3-layer $Al_2O_3$/Molybdenum/$Al_2O_3$ coatings developed here are significantly different because selective emission is provided over the spectral range that matches the bandgap of the TPV MIM cells (wavelength=1 to 3 microns), which is function-

SUMMARY OF THE INVENTION

This invention describes multilayer coatings for a TPV radiator that result in selective emissivity in the 1 to 3 micron range. Two three-layer embodiments are described. In the three-layer embodiments, a first oxide layer is placed on a radiator substrate. A second metal layer is placed over the first oxide layer. A third oxide layer is then placed over the second metal layer. In a particularly preferred embodiment, the radiator substrate is molybdenum, the first and third oxide layers are selected from the group consisting of $Al_2O_3$, $TiO_2$, and $HfO_2$ and are each approximately 10 to 2000 nm thick, and the second metal layer is molybdenum and is approximately 5 to 200 nm thick.

Two five-layer radiator coatings are disclosed. In the first embodiment, a first layer is placed on a radiator substrate, a second layer is placed over the first layer, a third layer is placed over the second layer, a fourth layer is placed over the third layer, and a fifth layer is placed over the fourth layer. In a particularly preferred embodiment, the radiator substrate is molybdenum. The first, third, and fifth layers are an oxide selected from the group consisting of $Al_2O_3$, $TiO_2$, and $HfO_2$ and are each approximately 10 to 2000 nm thick. The second and fourth layers are molybdenum and are each approximately 5 to 200 nm thick.

In a second five-layer coating embodiment, the first and fifth layers are a first oxide, which is an oxide selected from the group consisting of $Al_2O_3$, $TiO_2$, and $HfO_2$. Each layer is approximately 10 to 2000 nm thick. The second and fourth layers are a second oxide, which is an oxide selected from the group consisting of $Al_2O_3$, $TiO_2$, and $HfO_2$ and is different from the first oxide. Each of these layers is also approximately 10 to 2000 nm thick. The third layer is molybdenum and is approximately 5 to 200 nm thick.

Two seven-layer radiator coatings are disclosed. In the first embodiment, a first layer is placed on a radiator substrate, a second layer is placed over the first layer, a third layer is placed 5 over the second layer, a fourth layer is placed over the third layer, a fifth layer is placed over the fourth layer, a sixth layer is placed over the fifth layer, and a seventh layer is placed over the sixth layer. In a particularly preferred embodiment, the radiator substrate is molybdenum. The first, third, fifth, and seventh layers are an oxide selected from the group consisting of $Al_2O_3$, $TiO_2$, and $HfO_2$ and are each approximately 10 to 2000 nm thick. The second, fourth, and sixth layers are molybdenum and are each approximately 5 to 200 nm thick In a second seven-layer coating embodiment, the first, third, fifth, and seventh layers are a first oxide, which is an oxide selected from the group consisting of $Al_2O_3$, $TiO_2$, and $HfO_2$. Each m layer is approximately 10 to 2000 nm thick. The second and sixth layers are a second oxide, which is an oxide selected from the group consisting of $Al_2O_3$, $TiO_2$, and $HfO_2$ and is different IFV from the first oxide. Each of these layers is also approximately 10 to 2000 nm thick. The fourth layer is molybdenum id is approximately 5 to 200 nm thick.

Accordingly, an object of this invention is to prepare TPV radiators that selectively emit photons in the range of 1 to 3 microns by coating the radiators with multiple layers of oxides and metals.

Other objects, aspects, and advantages of the present invention will be pointed out in or will be understood from the following detailed description provided below in conjunction with the accompanying drawings.

BRIEF DESCRIPTION OF THE DRAWINGS

FIG. 9 shows the placement of the 5-layer oxide/Mo/oxide/Mo/oxide coating.

DETAILED DESCRIPTION OF THE PREFERRED EMBODIMENTS

The present invention describes multilayer coatings for TPV radiators that result in selective photon emission between approximately 1 to 3 microns. The preferred multilayer coatings comprise oxide and metal layers placed on a molybdenum radiator substrate. Three-layer, five-layer, and seven-layer coatings are disclosed. All embodiments enhance photon emission at a wavelength between 1 and 3 microns, which closely matches the bandgap of the TPV cell, thereby greatly improving the efficiency of the TPV cell.

The coating layers include oxides and metals. Oxide materials typically exhibit high emittance values over a wide wavelength range, while metals tend to exhibit low emittance values. By using a multilayer coating that includes both oxide and metal layers, the coating can be designed such that high emissivity values of the oxide are dominant at a wavelength range that matches the bandgap of TPV cells (1 to 3 microns), while the low emissivity values of the metal are obtained at a wavelength greater than 3 microns (energy<$E_g$) A software program (Film Wizard™) was used to model and design such multilayer coatings that provide selective emission for a molybdenum TPV radiator surface. These coatings have been designed to provide a high emittance at a wavelength range from 1 to 3 microns, which is an energy greater than or equal to bandgap energy of the TPV cell ($E_g$), to produce the high power density that is needed for a TPV system. Furthermore, these coatings have been designed to produce a low emittance at wavelengths greater than 3 microns, which corresponds to an energy less than the bandgap energy of the TPV cell ($E_g$), to improve the efficiency of the TPV system.

Figure 2:
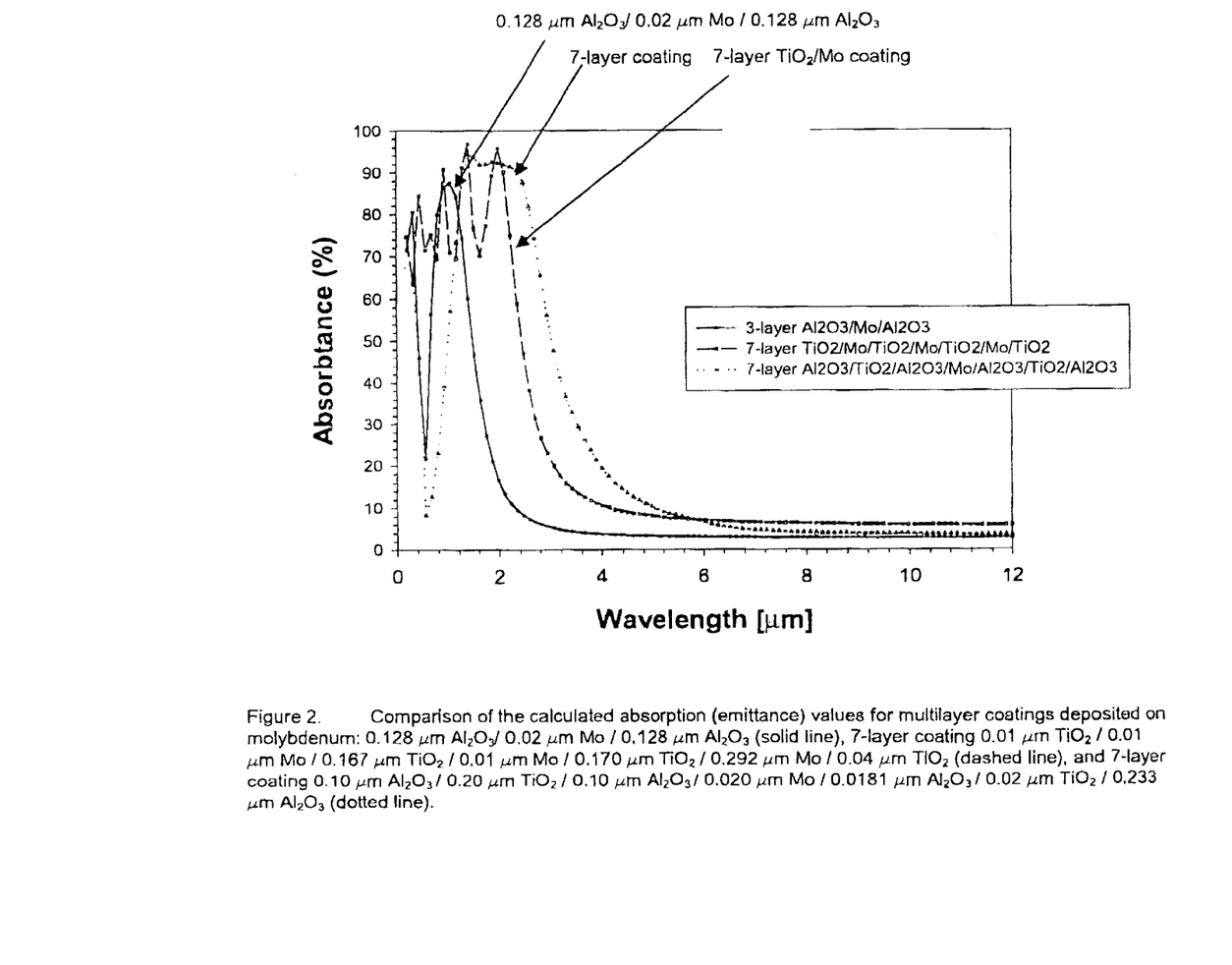
FIG. 2 is a comparison of the calculated absorption values for multilayer coatings deposited on molybdenum.

The absorptance of multilayer coatings, which is equal to emittance according to Kirchoff's law, was modeled using Film Wizard™. Spectral absorptance (emittance) curves for three different multilayer coating designs deposited on a molybdenum substrate are shown in FIG. 2: (1) three-layer $Al_2O_3/Mo/Al_2O_3$ coating, (2) 7-layer coating $TiO_2/Mo/TiO_2/Mo/TiO_2/Mo/TiO_2$ coating, and (3) 7-layer coating $Al_2O_3/TiO_2/Al_2O_3/Mo/Al_2O_3/TiO_2,Al_2O_3$. The most complete filling of the desired spectrum (1 to 3 microns) is provided by the 7-layer $Al_2O_3/TiO_2/Al_2O_3/Mo/Al_2O_3/TiO_2/Al_2O_3$ coating design. Calculated results for the radiator and TPV design would slightly improve the power density compared to an ideal greybody with an emissivity of 0.9. More importantly, the efficiency of the TPV MIM cell was improved by almost 50% with the use of the 7-layer coating. The coating designs shown in FIG. 2 have not been fully optimized. Bulk material data were used to model the coating designs shown in FIG. 2. These results show that a significant improvement in the performance of a TPV system could be achieved by the use of these coating designs for the radiator.

Three-layer $Al_2O_3/Mo/Al_2O_3$ coatings have been deposited on molybdenum. Single layer deposits were produced, and optical properties of these deposits were used to design the 3-layer $Al_2O_3/Mo/Al_2O_3$ coatings. The $Al_2O_3$ layer thicknesses tested were approximately 10 to 2000 nm thick, and the molybdenum layer was approximately 5 to 200 nm thick.

Figure 3:
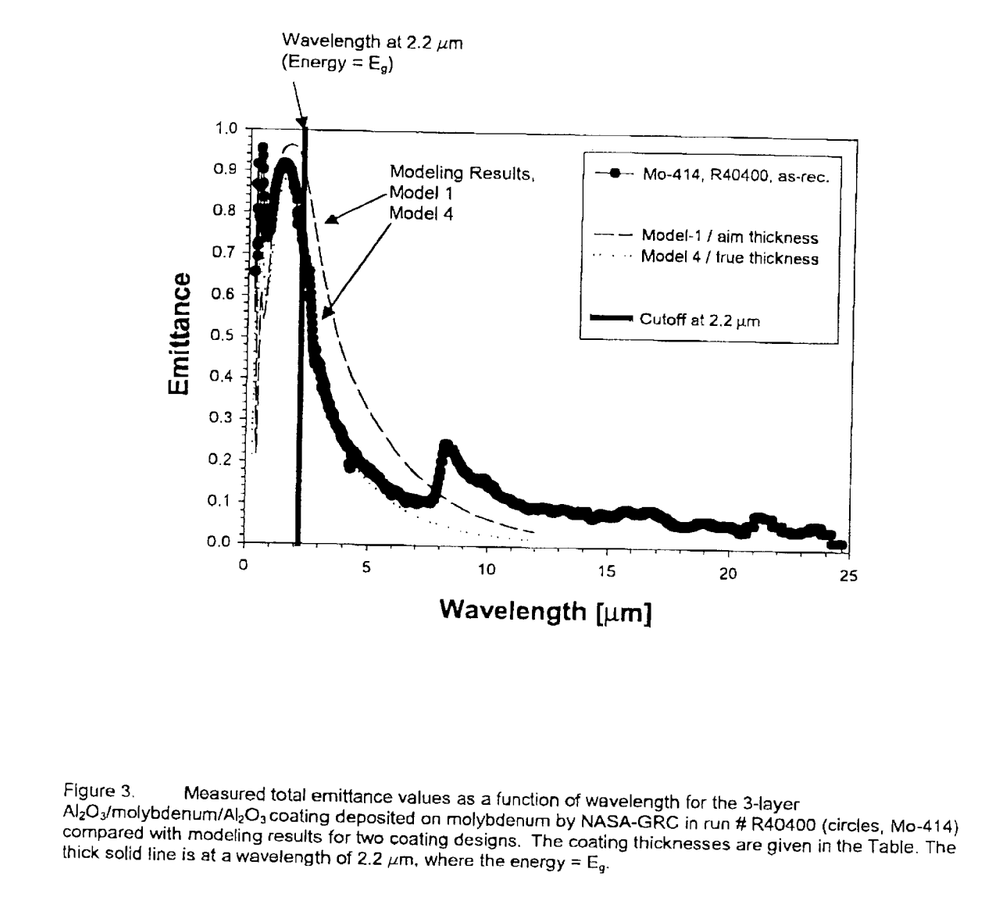
FIG. 3 is the measured total emittance values as a function of wavelength for the 3-layer $Al_2O_3/Mo/Al_2O_3$ coating deposited on molybdenum compared with modeling results for two coating designs.
Figure 4:
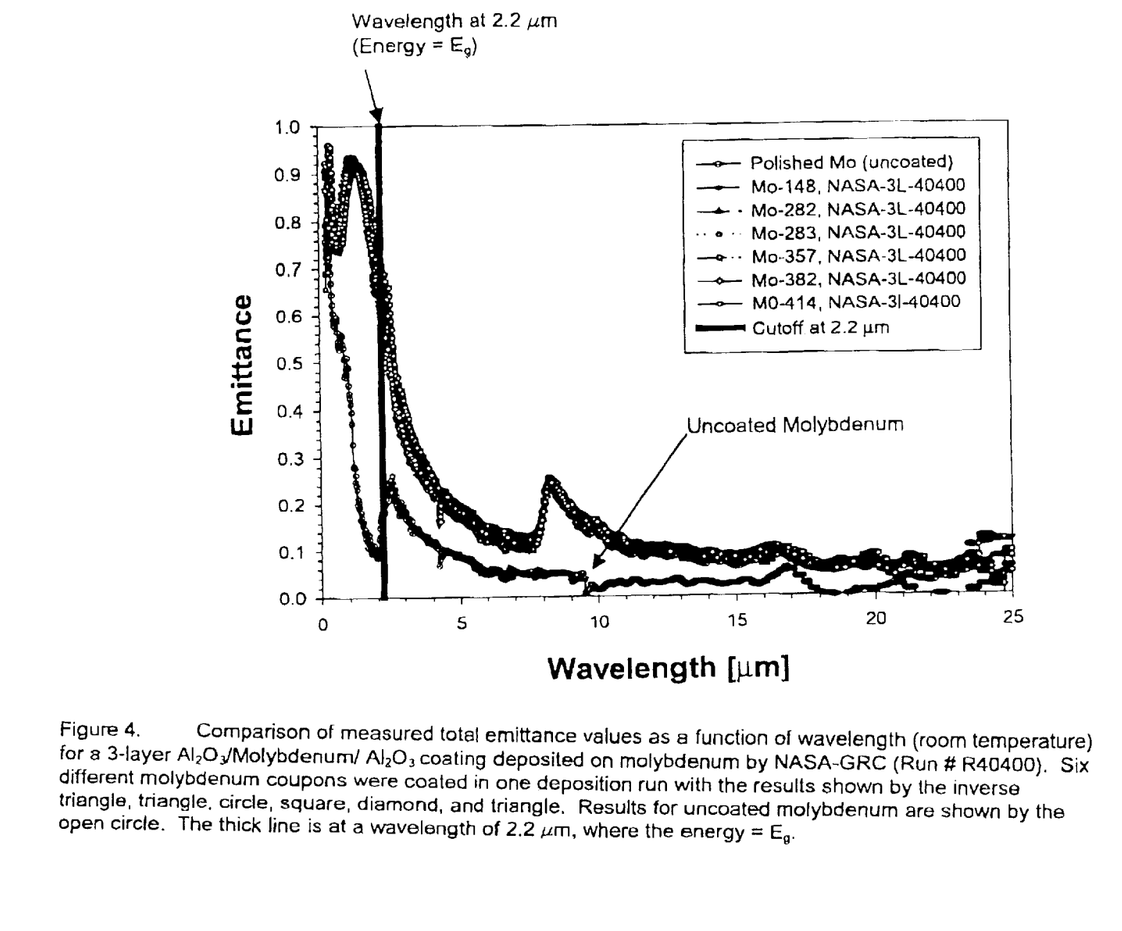
FIG. 4 is a comparison of measured total emittance values as a function of wavelength for a 3-layer $Al_2O_3/Mo/Al_2O_3$ coating deposited on molybdenum, wherein six different molybdenum coupons coated in one deposition run were compared with uncoated molybdenum.
Figure 5:
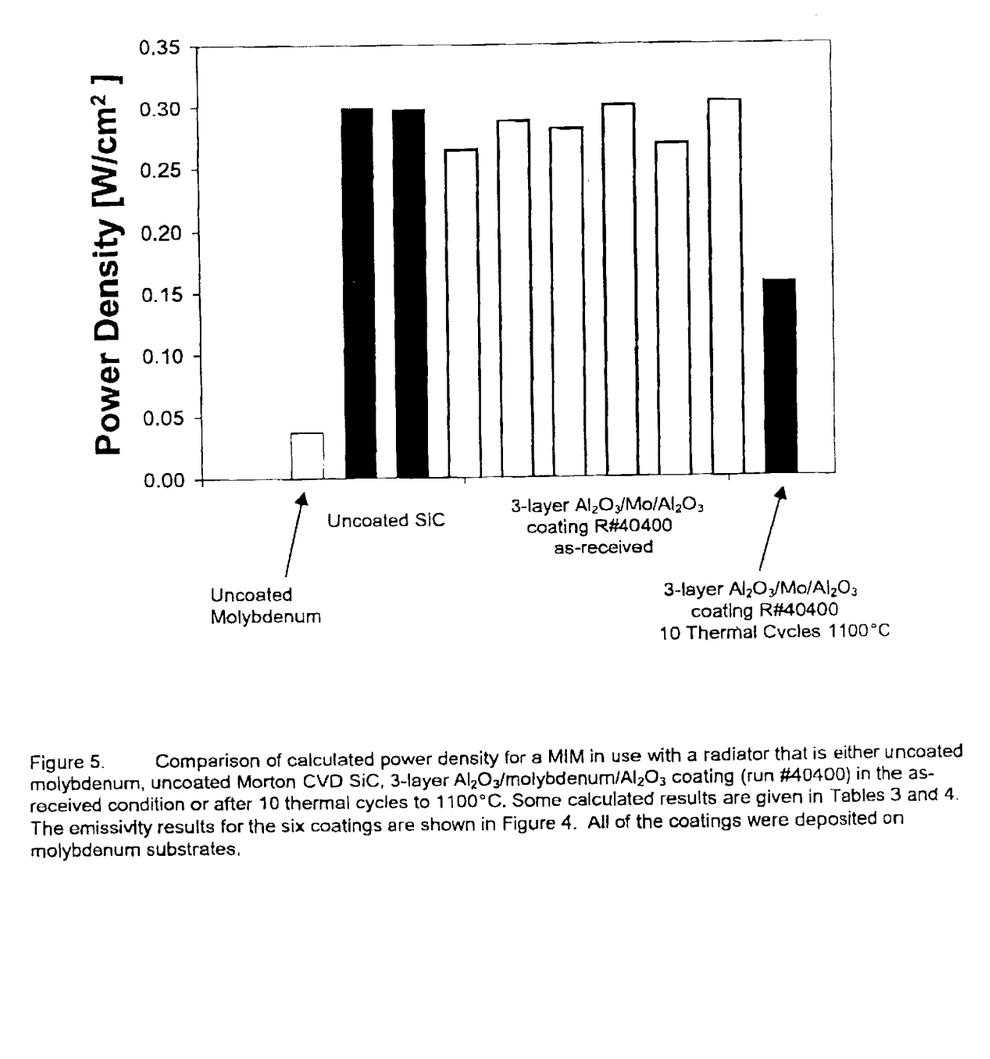
FIG. 5 is a comparison of calculated power density for a MIM in use with uncoated molybdenum, uncoated SiC, 3-layer $Al_2O_3/Mo/Al_2O_3$ in the as-received condition, and 3-layer $Al_2O_3/Mo/Al_2O_3$ after 10 thermal cycles at 1100 degrees C.
Figure 6:
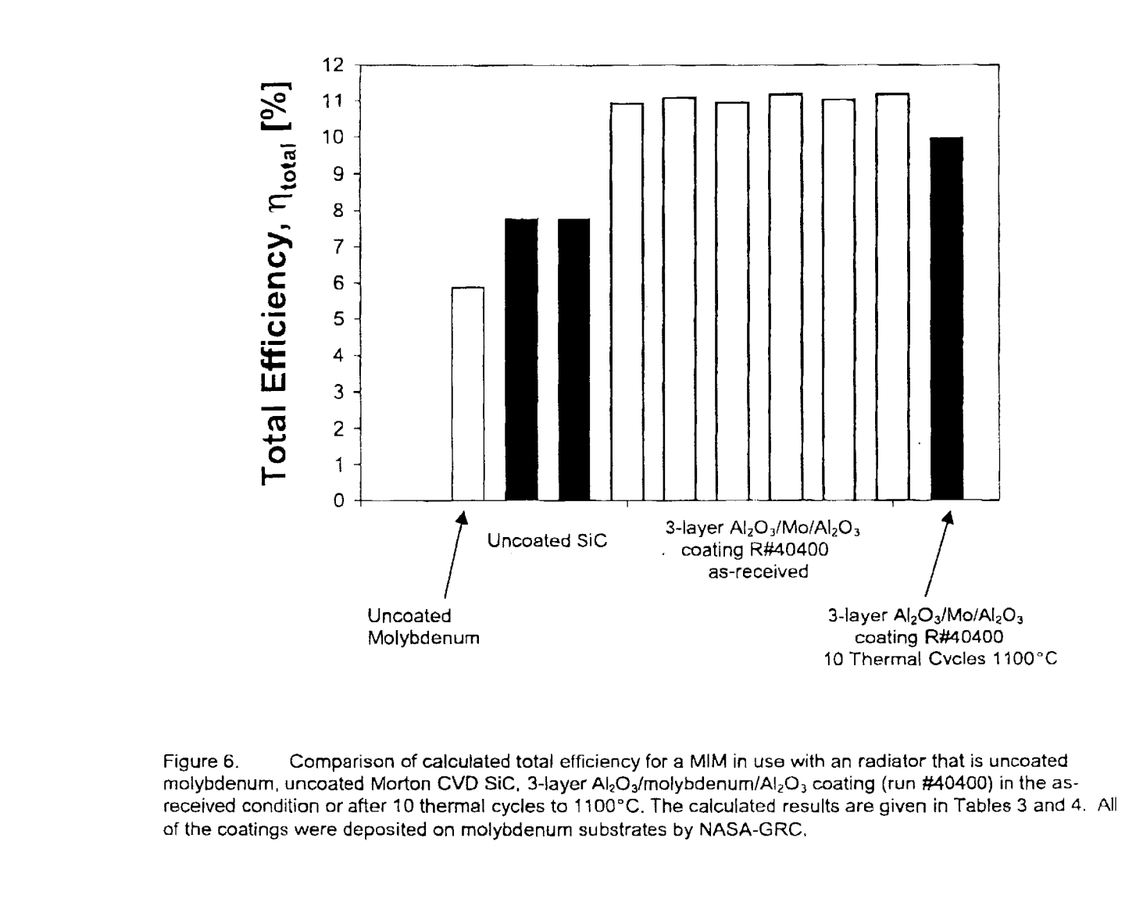
FIG. 6 is a comparison of calculated total efficiency for a MIM in use with uncoated molybdenum, uncoated SiC, 3-layer $Al_2O_3/Mo/Al_2O_3$ in the as-received condition, and 3-layer $Al_2O_3/Mo/Al_2O_3$ after 10 thermal cycles at 1100 degrees C.
Figure 7:
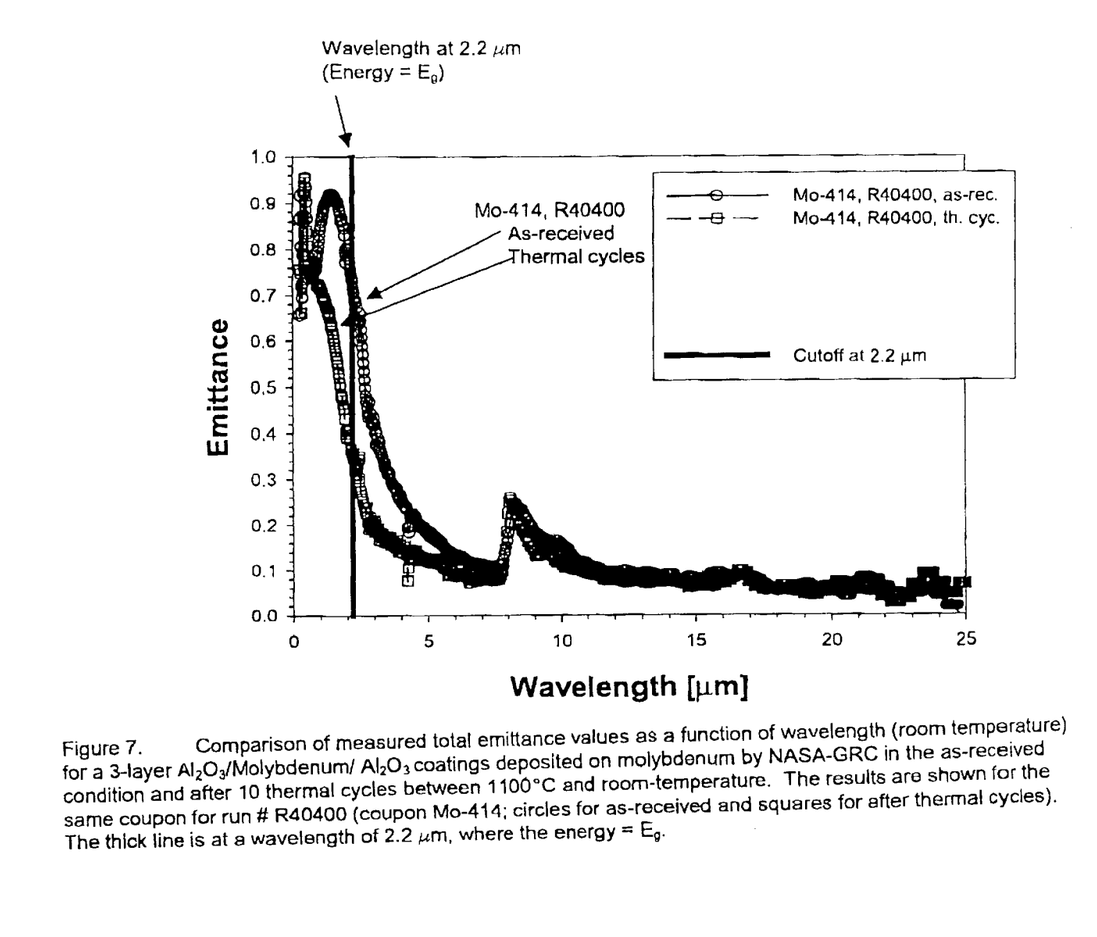
FIG. 7 is a comparison of measured total emittance values as a function of wavelength for a 3-layer $Al_2O_3/Mo/Al_2O_3$ coated deposit on molybdenum in the as-received condition and after 10 thermal cycles at 1100 degrees C.

The emissivity values determined by the modeling are shown in FIG. 3 to match the experimentally observed results. The spectral emittance values for six different coated samples that were produced in the same run are shown in FIG. 4 to be very reproducible. The calculated TPV MIM cell power density for the 3-layer $Al_2O_3/Mo/Al_2O_3$ coated molybdenum samples are shown in FIG. 5 to be significantly higher than uncoated molybdenum, and within the range of silicon carbide. Silicon carbide is a well-known greybody emitter radiator material with an emissivity value close to 0.9. More importantly, the spectral selectivity that is provided by the multilayer coating results in a 40–50% increase in the efficiency of the TPV MIM cells compared to the SiC radiator, see FIG. 6. These results for the 3-layer $Al_2O_3/Mo/Al_2O_3$ coating demonstrate that a multilayer coating can be used to produce a high surface emissivity and a high power density with a significant improvement in efficiency compared to a greybody coating. The results of FIG. 2 show that even higher power densities and efficiencies could be achieved by using a 7-layer coating design.

Figure 8:
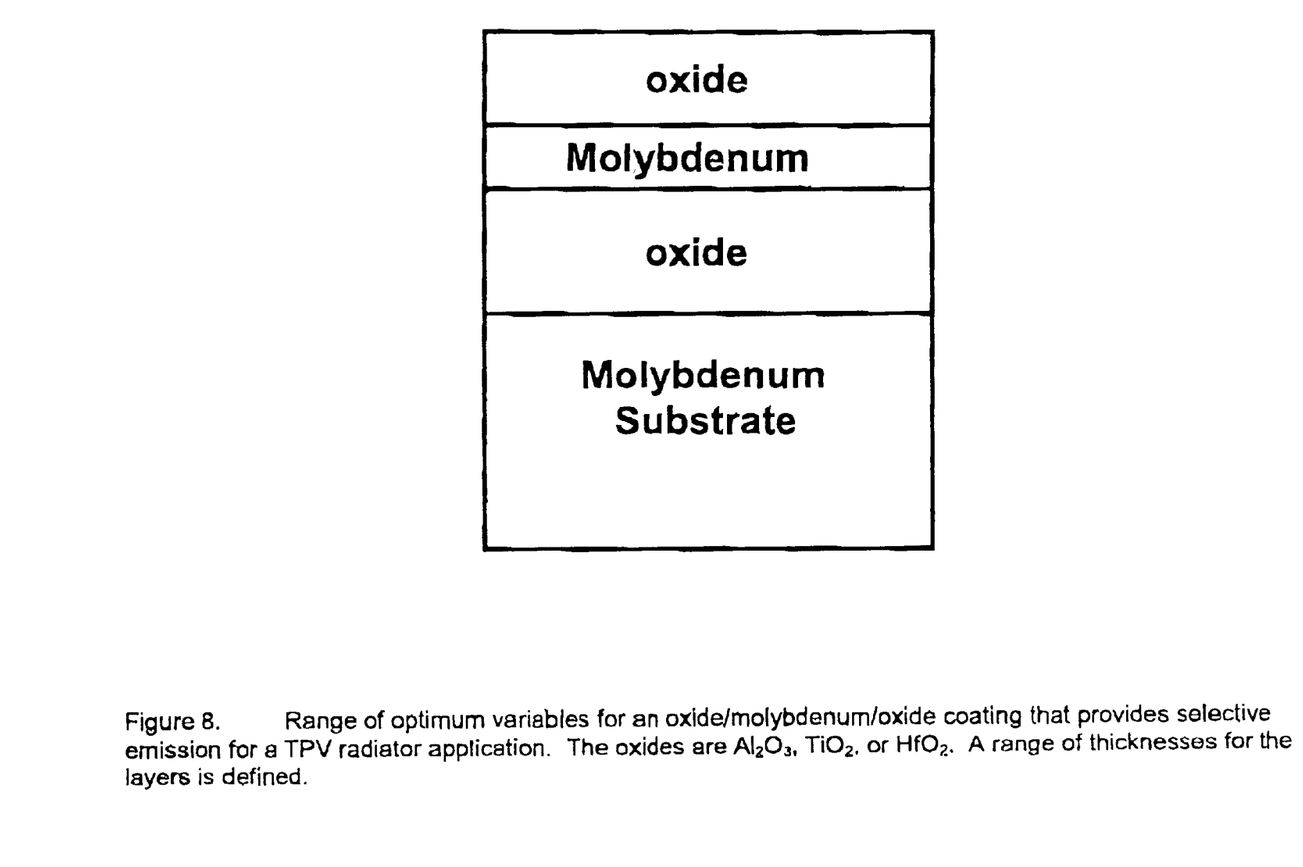
FIG. 8 shows the placement of the 3-layer oxide/Mo/oxide coating.

The most critical factors related to the use of a multilayer coating to selectively improve the surface emissivity of a molybdenum TPV radiator substrate and provide thermal stability are chemical compatibility of the oxide layers with molybdenum, and reducing the thermal stresses of the multilayer coating design. Three oxides that have acceptable chemical compatibility with molybdenum and also have a coefficient of thermal expansion (CTE) values that are close to molybdenum are $Al_2O_3$, $TiO_2$, and $HfO_2$. Modeling and experimental results have shown that a 3-layer oxide/molybdenum/oxide coating, where the oxide is $Al_2O_3$, $TiO_2$, or $HfO_2$, can provide selective emission with a high power density and a significant improvement in the efficiency of the TPV system. The parameters for the three-layer coatings are defined in FIG. 8. The oxide layer thicknesses tested were approximately 10 to 2000 nm thick, and the molybdenum layer was approximately 5 to 200 nm thick.

Figure 10:
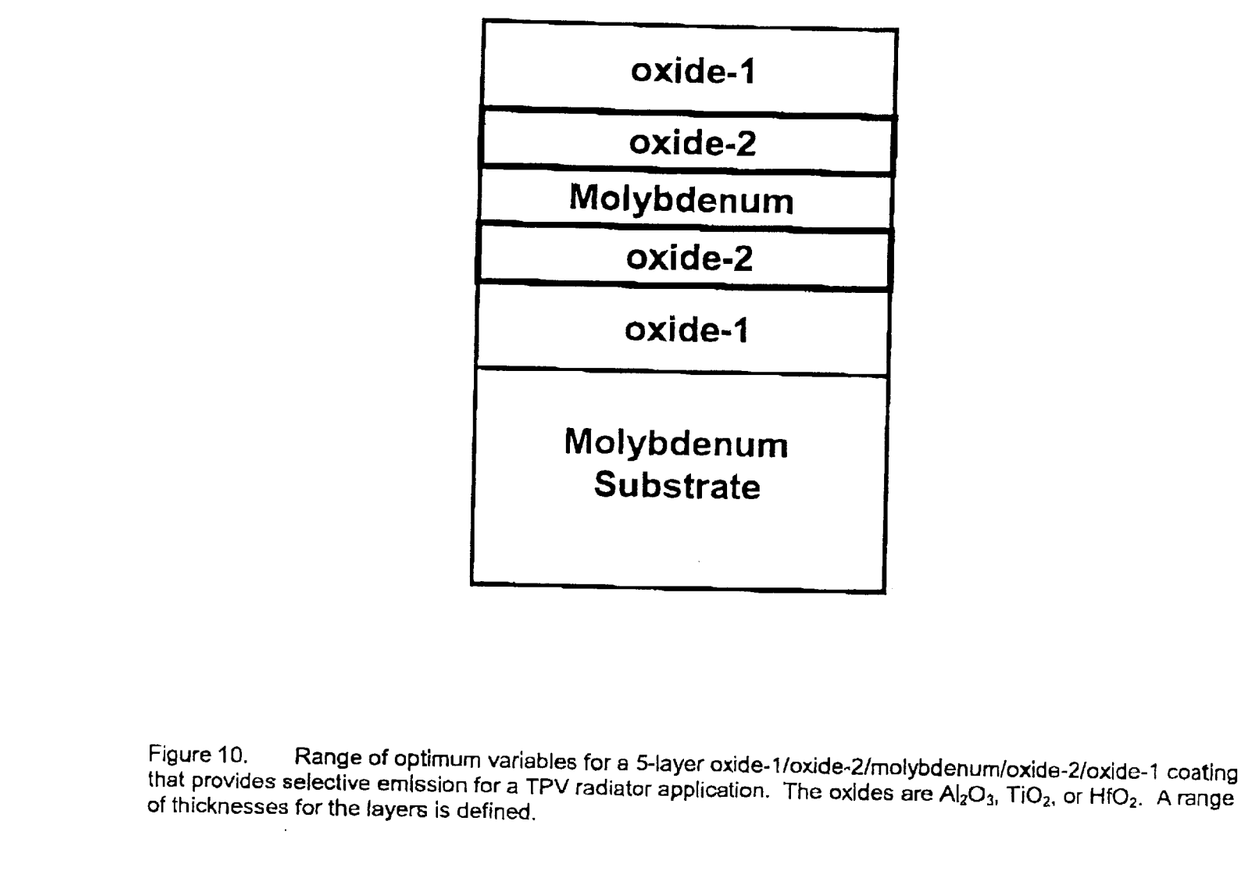
FIG. 10 shows the placement of the 5-layer oxide-1/oxide-2/Mo/oxide-2/oxide-1 coating.

The use of more coating layers provides more variables for producing a more optimum spectrum from a multilayer coating design, see FIG. 2. Two 5-layer coating designs are defined using molybdenum with either $Al_2O_3$, $TiO_2$, or $HfO_2$ as the oxide layers: (1) w oxide/molybdenum/oxide/molybdenum/oxide coating (FIG. 9), and (2) oxide-1/oxide-2/molybdenum/oxide-2/oxide-1 (FIG. 10). The oxide layer thicknesses tested were approximately 10 to 2000 nm thick, and the molybdenum layers were approximately 5 to 200 nm thick.

Figure 11:
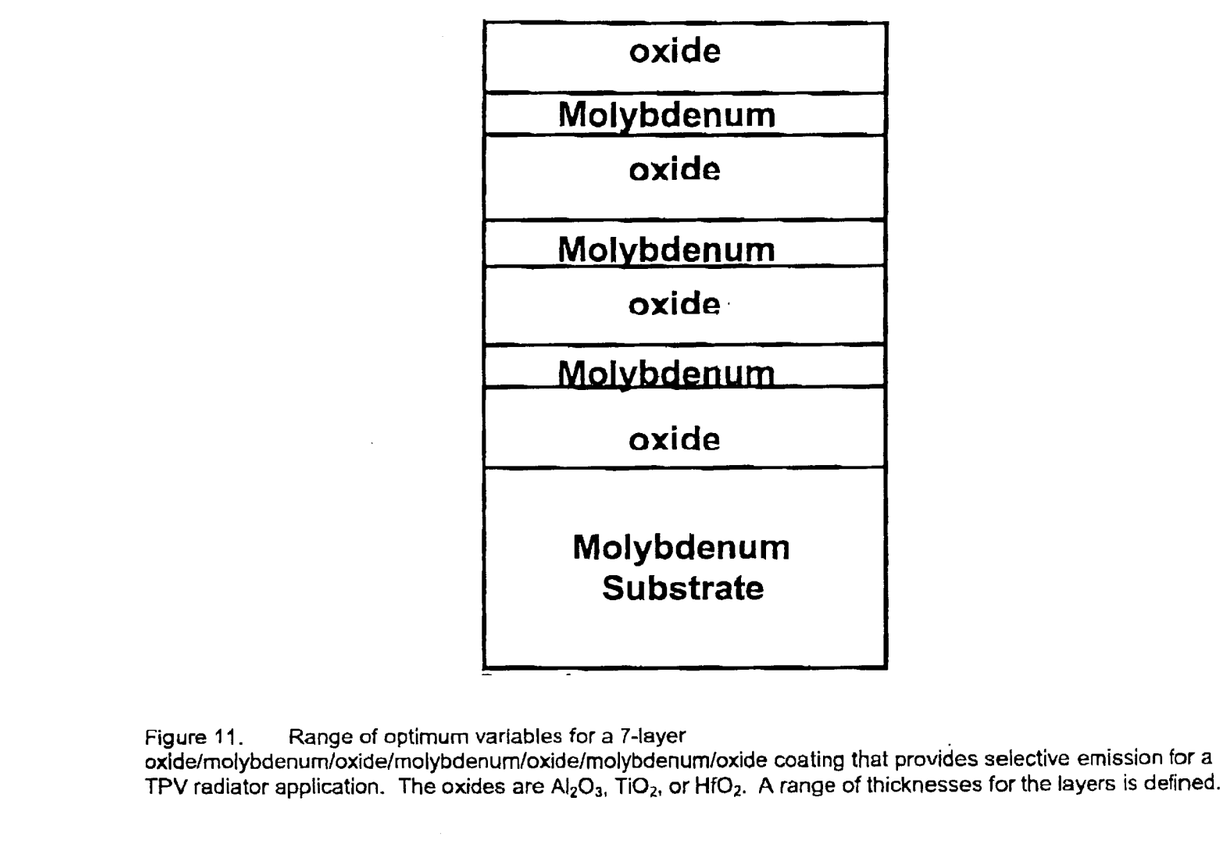
FIG. 11 shows the placement of the 7-layer oxide/Mo/oxide/Mo/oxide/Mo/oxide coating.
Figure 12:
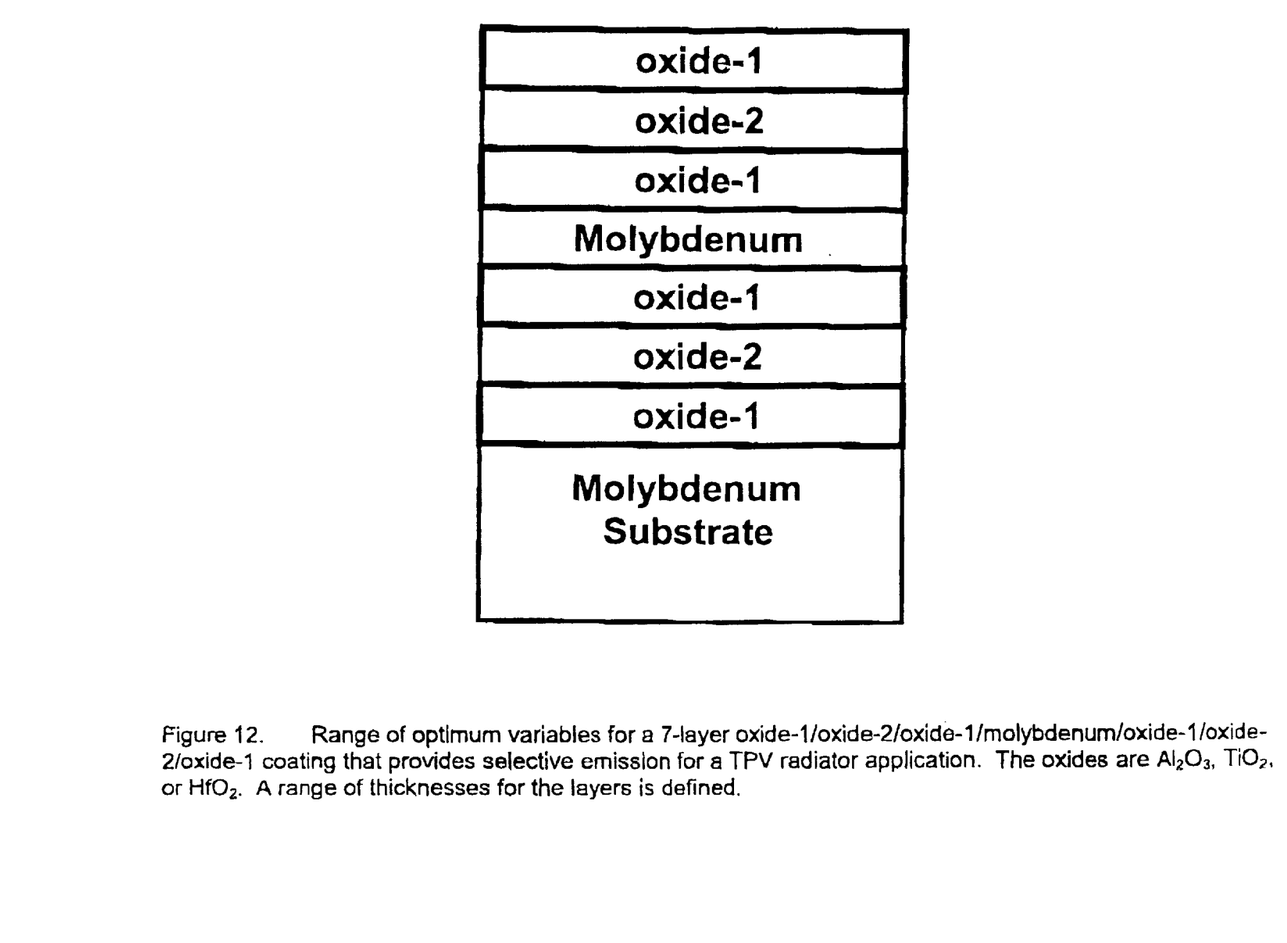
FIG. 12 shows the placement of the 7-layer oxide-1/oxide-2/oxide-1/Mo/oxide-1/oxide2/oxide-1 coating.

Two 7-layer coatings designs are defined with molybdenum with $Al_2O_3$, $TiO_2$, or $HfO_2$ as the oxide layers: (1) oxide/molybdenum/oxide/molybdenum/oxide/molybdenum/oxide coating (FIG. 11), and (2) oxide-1/oxide-2/oxide-1/molybdenum/oxide-1/oxide-2/oxide-1 (FIG. 12). Modeling results indicate that these coating designs would provide a higher power density and efficiency than could be produced using a 3-layer coating design, see FIG. 2. The oxide layer thicknesses tested were approximately 10 to 2000 nm thick, and the molybdenum layers were approximately 5 to 200 nm thick.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:
1. A TPV radiator coated with
   a. a first oxide layer placed onto a molybdenum radiator substrate;
   b. a second molybdenum metal layer placed onto said first oxide layer;
   c. a third oxide layer placed onto said second molybdenum metal layer;
   d. wherein said first and third oxide layers comprise an oxide selected from the group consisting of $Al_2O_3$, $TiO_2$, and $HfO_2$
   such that said TPV radiator selectively emits photons in the range of about 1 to about 3 microns.
2. The TPV radiator of claim 1, wherein said first and third oxide layers are about 10 to 2000 nm thick and wherein said second metal layer is about 5 to 200 nm thick.
3. A TPV radiator coated with
   a. a first layer placed onto a radiator substrate
   b. a second layer placed onto said first layer
   c. a third layer placed onto said second layer
   d. a fourth layer placed onto said third layer
   e. a fifth layer placed onto said fourth layer
   such that said TPV radiator selectively emits photons in the range of about 1 to about 3 microns.
4. The TPV radiator of claim 3, wherein
   a. said radiator substrate is molybdenum;
   b. said first, third, and fifth layers are an oxide selected from the group consisting of $Al_2O_3$, $TiO_2$, and $HfO_2$; and wherein
   c. said second and fourth layers are molybdenum.
5. The TPV radiator of claim 4, wherein said first, third, and fifth layers are each about 10 to about 2000 nm thick, and wherein said second and fourth layers are each about 5 to about 200 nm thick.
6. The TPV radiator of claim 3, wherein
   a. said radiator substrate is molybdenum;
   b. said first and fifth layers are oxide-1, wherein oxide-1 is selected from the group consisting of $Al_2O_3$, $TiO_2$, and $HfO_2$,
   c. said second and fourth layers are oxide-2, wherein oxide-2 is selected from the group consisting of $Al_2O_3$, $TiO_2$, and $HfO_2$, wherein oxide-1 and oxide-2 are different, and wherein
   d. said third layer is molybdenum.
7. The TPV radiator of claim 6, wherein said first, second, fourth, and fifth layers are each about 10 to about 2000 nm thick, and wherein said third layer is about 5 to about 200 nm thick.
8. A TPV radiator coated with
   a. a first layer placed onto a radiator substrate
   b. a second layer placed onto said first layer
   c. a third layer placed onto said second layer
   d. a fourth layer placed onto said third layer
   e. a fifth layer placed onto said fourth layer
   f. a sixth layer placed onto said fifth layer
   g. a seventh layer placed onto said sixth layer
   such that said TPV radiator selectively emits photons in the range of about 1 to about 3 microns.
9. The TPV radiator of claim 8, wherein
   a. said radiator substrate is molybdenum;
   b. said first, third, fifth, and seventh layers are an oxide selected from the group consisting of $Al_2O_3$, $TiO_2$, and $HfO_2$, and wherein
   c. said second, fourth, and sixth layers are molybdenum.
10. The TPV radiator of claim 9, wherein said first, third, fifth, and seventh layers are each about 10 to about 2000 nm thick and wherein said second, fourth, and sixth layers are each about 5 to about 200 nm thick.

11. The TPV radiator of claim 8, wherein
   a. said radiator substrate is molybdenum;
   b. said first, third, fifth, and seventh layers are oxide-1, wherein oxide-1 is selected from the group consisting of $Al_2O_3$, $TiO_2$, and $HfO_2$,
   c. said second and sixth layers are oxide-2, wherein oxide-2 is selected from the group consisting of $Al_2O_3$, $TiO_2$, and $HfO_2$ and wherein oxide-1 and oxide-2 are different, and wherein
   d. said fourth layer is molybdenum.

12. The TPV radiator of claim 11, wherein said first, second, third, fifth, sixth, and seventh layers are each about 10 to about 2000 nm thick, and wherein said fourth layer is about 5 to about 200 nm thick.

* * * * *